United States Patent [19]

Hayashi

[11] Patent Number: 4,541,603

[45] Date of Patent: Sep. 17, 1985

[54] SUPPORT ARRANGEMENT FOR AC MOTOR

[75] Inventor: Masahiro Hayashi, Hyogo, Japan

[73] Assignee: Mitsubishi Denki Kabushiki Kaisha, Tokyo, Japan

[21] Appl. No.: 610,865

[22] Filed: May 16, 1984

[30] Foreign Application Priority Data

May 17, 1983 [JP] Japan ................................ 58-87851

[51] Int. Cl.⁴ .............................................. F16M 9/00
[52] U.S. Cl. ..................................... 248/679; 310/42; 310/91
[58] Field of Search ..................... 310/91, 42, 90, 261, 310/262, 264, 265; 248/679, 678

[56]         References Cited
U.S. PATENT DOCUMENTS

| 3,012,161 | 12/1961 | Puder | 310/261 |
| 3,629,629 | 12/1971 | Liebe | 310/269 |
| 4,467,229 | 8/1984  | Ogita | 310/269 |

FOREIGN PATENT DOCUMENTS

| 0936582 | 11/1973 | Canada | 310/261 |
| 0046641 | 4/1981  | Japan  | 310/91  |

Primary Examiner—R. Skudy
Attorney, Agent, or Firm—Bernard, Rothwell & Brown

[57] ABSTRACT

A rolling mill driving AC motor including a stator, a rotor engaged with the stator and mounted on a rotor spider, stub shafts extending removably from the rotor spider respectively to a load side and the side opposite to the load side. Further a pair of bearing pedestals erected on a bed for supporting both said stub shafts, and a pit formed in a lower central portion of the bed.

4 Claims, 6 Drawing Figures

SUPPORT ARRANGEMENT FOR AC MOTOR

BACKGROUND OF THE INVENTION

1. Field of the Invention

The present invention relates to an AC motor for driving a rolling mill and more particularly to a rolling mill driving AC motor which must be occasionally disassembled and reassembled and which is used under such a condition as permits only a limited axial space for drawing out a rotor.

2. Description of the Prior Art

Heretofore, as this type of a motor there has been proposed such a motor as illustrated in FIGS. 1A through 1C. More particularly, FIG. 1A is a front view of the aforementioned type of a rolling mill driving AC motor, in which, by way of simplification, only a top half portion of a stator and that of a rotor are shown, end bells are omitted and the details of a slip ring are also omitted. In the case of a squirrel-cage induction motor, the slip ring is not needed. FIGS. 1B and 1C are respectively partial left- and right-hand side views illustrating a positional relationship between a bed and a bearing pedestal in FIG. 1A. In FIG. 1A, the stator is composed of a stator active part 2 and a stator support 1 which supports the stator active part. On the other hand, the rotor is composed of a rotor active part, 3, a rotor spider 4 and a shaft 5. The rotor active part 3 is mounted on the rotor spider 4 and forms a so-called rotor. The rotor spider 4 is shrunk onto the shaft 5.

The rotor is supported through bearing pedestals 6 and 8 and the motor as a whole is mounted on a bed 10 which is a concreted integral bed. In the central portion of the bed 10 is formed a pit 10a having a length $L_1$ in the axial direction of the shaft 5. The pit 10a is used for the connection of external leads or as a ventilation path.

The above conventional motor has the following drawbacks. First, for drawing out the rotor, it is necessary that the stator as an armature be divided horizontally in two, or when the rotor is to be drawn out in the axial direction, it is necessary that an extra space having a length almost equal to the overall length of the rotor be ensured in the axial direction. But, actually, these necessities cause a serious inconvenience, as will be described later in detail.

Conventional AC motors are generally operated at constant speeds and their installation space is not specially limited; besides, their rated speeds are relatively high, so even in the case of a large output motor, the size of the motor does not become so large. Consequently, even a large output motor could be easily installed and disassembled by the method in which first an integral stator is installed by means of a crane and then a rotor is inserted therein in the axial direction.

On the other hand, as rolling mill driving motors, DC motors have heretofore been used in most cases, which motors are generally low in speed (e.g. 6.5 MW 50/100 r.p.m.) and have a large overload capability in normal operation, e.g. 225% of rated base speed torque. Further, in the cases of slabbing mill and plate mill, a twin drive arrangement system is adopted, so the installation space is extremely limited. Moreover, in continuous hot strip mills five to seven finishing rolling stands (10-15 MW per stand) are arranged and therefore large-sized motors for driving those rolling mills are also disposed concentratively in a limited space.

In such rolling mill driving DC motors, it has been an essential requirement that the frame, namely, the stator, be divided in two in a horizontal position, for inspection and maintenance of the interior of the motor and in view of the crane capacity.

First, as to the inspection and maintenance of the interior of the motor, since rolling is performed under severe operational conditions involving quick acceleration, deceleration and reversal as well as mechanical and electrical impact load, there has been conducted a periodic inspection and maintenance of the interior of the stator and that of the rotor. Further, in the event of occurrence of a trouble in the interior of the motor, it is first required that the interior of the motor be opened quickly. The longer the duration of down time of the rolling operation, the more serious the expense, so in order to minimize the time required for inspection of the interior of the motor, it is absolutely necessary that the motor be opened quickly.

Next, in connection with the crane capacity, unless the frame or the stator is divided in two, horizontally, there is no space to draw out a rotor in the axial direction, and consequently the motor, including both the stator and the rotor, must be lifted integrally. In a hot reversing rolling mill such as slabbing mill or plate mill and where the motor is of a large torque, it requires more than 250 tons in weight of a motor. Consequently, it becomes necessary to use a crane of a large capacity, that is, an enormous amount of expense is required for building a housing structure strong enough to support such crane, for strengthening the piling foundation work comparable thereto, etc. Actually, therefore, the frame is divided in two horizontally, and the crane capacity is determined according to the heaviest piece (usually the rotor) among the rotor and the top and bottom frame portions.

Even without dividing the frame in two, a crane capacity according to only the rotor may suffice provided the rotor can be inserted in the axial direction. But, this is inapplicable to the case of a twin drive arrangement system in a hot reversing rolling mills. Also in the case of a continuous hot strip mill finishing stands, the following problems are involved. In the case of a single motor, the axial space doubles. In the case of a tandem motors, the axial length increases by a space corresponding to one motor, but in the case of taking out a front motor, all the rear motors must be removed before removal of the front motor. Therefore, in both the cases of a single and a tandem motors, the width of a motor room becomes larger; that is, an extra land is needed throughout the overall length of the motor room which is usually as large as 100 to 300 meters. Besides, this extra land is mostly a dead space, and the crane is required to have a larger span, which leads to an increased cost. Thus, there arise unacceptable problems.

In the case of using AC variable speed motors which have recently expanded their uses rapidly, such as induction motor and synchronous motor, in place of DC motors as main motors for driving rolling mills, either the foregoing requirement of dividing the frame in two as in the case of DC motors, or at least an equivalent function, must be satisfied. In this connection, the drawbacks of the prior art will be summarized below.

[1] In the case of dividing the frame:

Since DC motors are revolving-armature type, a mere division of the stationary field portion suffices in dividing the frame in two. But, AC motors are generally stationary-armature type, so the bisection of the frame is the very bisection of the armature portion. Usually, the armature voltage in a large-sized AC motors is high, and the armature coil in each armature slot comprises several-turn coils. Even assuming that the armature core can be easily divided in two, in order to divide the armature coil, at both front and rear coil end portions, on the right and left of the divided portion of the armature, it is necessary that the several-turn coils of every phase with a high voltage imposed thereon be bonded with bolts or by brazing. Consequently, not only a considerable time is required for disassembling and reassembling work, but also in point of reliability there may occur a bolt loosening at the live joints or burning of insulation materials near the brazing point, so this method is not considered to be a desirable method. Moreover, a long time (about 60 hours) is required for only disassembling and reassembling work, so it is absolutely impossible to finish a series of work such as disassembling, repairing and reassembling within the maximum allowable time (48 hours) as in DC motors for ordinary customers.

In the case of large water-wheel generator, the frame is divided into several portions for assembly at the installation site, but this is because of an ultra-large size thereof which makes the transport as a one body impossible. Once assembled at the installation site, it is not required that the frame will be disassembled for inspection, so such a large-sized waterwheel generator does not serve as a good reference.

[2]In the case of using a frame shifting device of a conventional standard type in synchronous motor:

The use of such a device is not acceptable for the foregoing reasons, for example, the limited space, but even if it could be mounted, it would result in increase of the axial length and tend to cause "lowering of torsional vibration frequency" which is a serious problem in the rolling use. Thus, the use of such a device is undesirable.

SUMMARY OF THE INVENTION

The present invention has been accomplished for overcoming the above-mentioned drawbacks of the conventional AC motors for rolling mill use and in view of the necessity that an AC variable speed motor as a substitute for the conventional DC motors should at least have an equivalent function in point of the conditions for installation and disassembly which have been satisfied by the conventional DC motors. More particularly, such AC motor is constructed without adopting the divided structure of the stator which structure deteriorates the reliability, while allowing the features of the AC motors to be exhibited 100% and ensuring reliability, and so that a crane capacity suffices based on the heaviest weight of the motor, that is usually rotor. That is, it is an object of the present invention to provide an AC motor for driving a rolling mill which is practical and effective and which can attain such construction without increasing the width of an motor room.

Other objects and advantages of the present invention will become apparent from the following detailed description of a preferred embodiment of the invention.

DESCRIPTION OF THE PREFERRED EMBODIMENTS

Figure 1A:
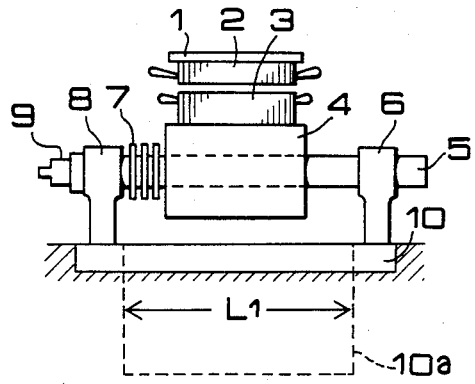
FIG. 1A is a schematic front view of a conventional rolling mill driving AC motor.
Figure 2A:
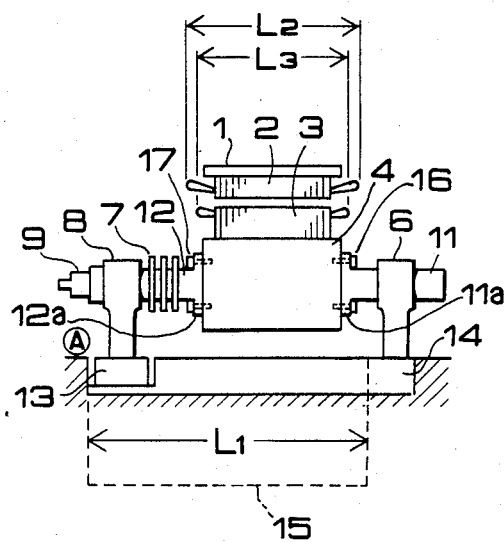
FIG. 2A is a schematic front view of a rolling mill driving AC motor according to an embodiment of the present invention.
Figure 2B:
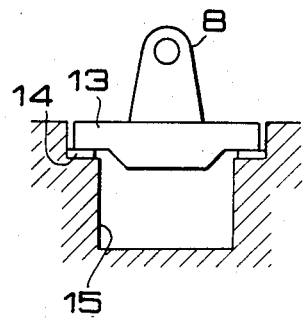
FIG. 2B is a left-hand side view showing a part of FIG. 2A.
Figure 2C:
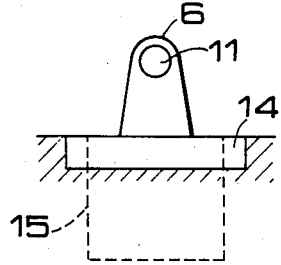
FIG. 2C is a right-hand side view showing a part of FIG. 2A.

Referring to FIGS. 2A through 2C, there is illustrated an embodiment of the present invention, in which the same or corresponding portions are indicated by the same reference numerals. The shaft 5 shown in FIG. 1A is a single shaft press-fitted in the rotor spider 4, while in this embodiment the corresponding shaft is divided in three. More specifically, as shown in FIG. 2A, the shaft is composed of a rotor spider portion 4 which is centrally positioned, a stub shaft 11 on the load side and a stub shaft 12 on the side opposite to the load side. The stub shafts 11 and 12 are formed with flanges 11a and 12a on the respective end faces on the spider side. The flanges 11a and 12a are secured to the central rotor spider 4 with bolts 16 and 17. Thus, the rotor is composed of a rotor active part 3, rotor spider 4 and stub shafts 11 and 12.

The bed 10 shown in FIG. 1A is of an integral construction, while in this embodiment the corresponding bed is divided into a bed 13 for the exclusive use of one bearing pedestal 8 and a bed 14 for all the other parts including the other bearing pedestal 6. The bed 14 is concreted to the ground, while the bed 13 is not concreted but is threadedly engaged with a foundation bolt (not shown) or bed 14 so that it can be removed. Of course joint surfaces between bed 13 and 14 are to be machined.

The numeral 15 denotes a spatial pit formed in a central portion of the bed, the pit axial length extending up to the portion below the bed 13, on the side opposite the load side, as shown in FIG. 2A so that stator and rotor are to be able to pass each other. The bed 14 extends beyond the end of the pit 15 on the load side, as shown in FIG. 2A. Where an axial thrust is applied, the bearing pedestal 6 firmly fixed to the ground may be endowed with a double thrust bearing function.

The operation of the rolling mill driving AC motor having the above-described construction will now be described in detail, first with respect to the removal of the rotor.

[1](a) Remove the bolts of the flange portion of the stub shaft 12 coupled to the rotor spider 4 after inserting a suitable spacer into the gap between cores of the bottom half portion of a stator active part 2 and that of the rotor active part 3 so that the rotor may not assume the state of cantilever.

(b) Remove the bearing pedestal 8, accessory 9, stub shaft 12 with a slip ring 7 and bed 13.

(c) Stretch out a support arm (not shown) with a mounting leg fixed to the ground portion Ⓐ on the left-hand side of the bed 13 and bolt it to the tapped hole used for coupling the stub shaft 12 to the rotor spider 4. This temporary support arm means cooperates with the stub shaft 11 to support the rotor spider 4.

(d) Move a whole stator 1 and 2 to the left, and, upon reaching the inside wall of the portion Ⓐ, a portion $L_3$ (corresponding to the overall length in the axial direction of the rotor coil) which comprises the rotor active part 3 and the rotor spider 4 is completely exposed.

(e) Pass a lifting rope round the rotor active part 3, then remove the stub shaft 11 and the bolt of the flange portion of the temporary support arm both of which have supported the rotor spider 4, and lift only the rotor portions 3, 4 with the rope.

(f) Lift up the rotor portions 3 and 4. In this case, the other end or the output end of the stub shaft 11 is directly coupled to the machine side, but it may be left intact.

(g) If necessary, lift out also the stator portions 1 and 2.

(h) Reassembling can be done by reversing the above procedure.

Figure 1B:
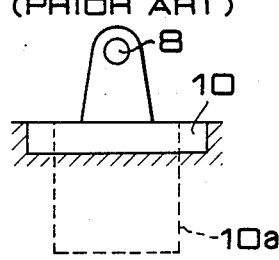
FIG. 1B is a left-hand side view showing a part of FIG. 1A.
Figure 1C:
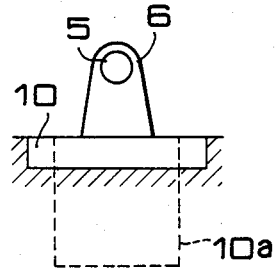
FIG. 1C is a right-hand side view showing a part of FIG. 1A.

[2] The above procedure is applied when the axial core length is long as compared with the diameter of the rotor active part 3. Conversely, where the axial core length is short as compared with the rotor diameter, the procedure becomes simpler, provided it is necessary to satisfy $L_2 + L_3 < L_1$. Usually, $L_1$ is determined in accordance with the size of the slip ring 7, ventilating air volume to be handled and $L_2$, without the idea of $L_2 + L_3 < L_1$. In this case, it is not necessary to divide the bed in two or form a pit up to the portion below the bed 13 as in FIG. 2A in other words, the structure of the bed 10 shown in FIG. 1 will do. The procedure is as follows.

(a) Remove the left and right stub shafts 12 and 11 after removing the bolts which couple both stub shafts to the rotor spider 4.

(b) Mount temporary rotor support arm means of a structure similar to that mentioned in [1]-(c) from both left- and right-hand sides through the threaded portions of the rotor spider 4. In this case, the support arm means may be fixed to the bearing pedestals 6 and 8.

(c) For example, if the stator is moved to the left-most end and the rotor to the rightmost end, the rotor will be completely exposed from the stator because of the foregoing condition $L_2 + L_3 < L_1$.

(d) Lift the rotor portions 3 and 4 and the stator portions 1 and 2 independently of each other.

(e) For reassembling, reverse the above procedure.

In the above procedure, the axial length of the slip ring portion 7 and that of the opposite side (between 4 and 6) do not largely change regardless of the overall axial length $L_2$ of the stator coil, so when the axial core length is short, the removal of the rotor becomes realizable because the space corresponding to the above length.

[3] In the case of a tandem motors, the bearing pedestal portion positioned between front end and rear motors may be endowed with the function of the divided bed 13.

(a) Thus, since the rotor weight (usually as a heaviest piece) for determination of the crane capacity may be the weight of only the central spider rotor portion 3, 4, a smaller crane capacity will do.

(b) Brief inspection of the interior can be attained only in the range in which the stator portions 1 and 2 can be moved to the left and right.

(c) In transport, as compared with the conventional integral rotor (having an overall axial length of say 8 m or so), the rotor portion is divided in three (for example, the central spider rotor portion is a little less than 3 m long), and therefore the size per packing can be reduced to a remarkable extent.

According to the present invention, as set forth hereinabove, the rotor is divided in three, the bed is divided in two and the lower portion of the bed on the side opposite to the load side is formed with a space, whereby a function equal to that attained by bisection of the frame in a rolling mill driving DC motor can be realized and consequently there can be provided a rolling mill driving AC motor having functions comparable to those of DC motors, including electrical and mechanical functions.

Further, since heaviest weight of the motor is usually rotor and the crane capacity may be determined on the basis of the weight of only the central spider rotor, a smaller crane capacity than in the case of DC machine can be adopted, which leads to the reduction in cost of crane and housing. Additionally, since the rotor is divided in three, the size per packing is reduced in transport, thus leading to saving of the transport cost.

What is claimed is:

1. An AC motor for driving a rolling mill, comprising:
   a stator;
   a rotor engaged with said stator and mounted on a rotor spider;
   stub shafts extending removably from said rotor spider respectively to a load side and the side opposite to the load side;
   a bed for said motor;
   a pair of bearing pedestals erected on said bed for supporting both said stub shafts the first of said bearing pedestals being positioned on the load side and the second of said bearing pedestals being positioned on the side opposite the load side;
   said bed being divided into a first bed section for supporting said first pedestal and a second bed section for supporting said second pedestal; and
   a pit formed below said bed; said bed extending beyond said pit on the load side and terminating substantially at the end of said pit on the side opposite to the load side;
   said pit at the end opposite to the load side extending to a position below said second pedestal so that the stator can be moved axially a distance sufficient to expose the rotor for removal.

2. An AC motor for driving a rolling mill according to claim 1, wherein said rotor spider and both said stub shafts are coupled with bolts.

3. An AC motor for driving a rolling mill according to claim 1, wherein an overall axial length $L_2$ of a stator coil, and overall axial length $L_3$ of a rotor coil and an overall axial length $L_1$ of said pit are set at values which satisfy the following relationship: $L_2 + L_3 < L_1$.

4. An AC motor for driving a rolling mill, comprising:
   a stator;
   a rotor engaged with said stator and mounted on a rotor spider;
   stub shafts extending removably from said rotor spider respectively to a load side and a side opposite to the load side;
   a bed for said motor;
   a pit formed below said bed;
   said bed including a first bed section extending beyond said pit on the load side and terminating substantially at the end of said pit on the side opposite to the load side;
   said bed further including a second bed section positioned substantially at the end of said pit on the side opposite the load side and supported on said first bed section;

a pair of bearing pedestals, including a first pedestal disposed at the load side and a second pedestal disposed at the side opposite to the load side;

said first pedestal being supported on said first bed section beyond the end of said pit at the load side and said second pedestal being supported on said second bed section above said pit at the end of the pit opposete to the load side.

* * * * *

UNITED STATES PATENT AND TRADEMARK OFFICE
CERTIFICATE OF CORRECTION

PATENT NO. : 4,541,603

DATED : September 17, 1985

INVENTOR(S) : Masahiro Hayashi

It is certified that error appears in the above-identified patent and that said Letters Patent is hereby corrected as shown below:

Column 3, line 18, "work" should read --operations--.

Signed and Sealed this

Twenty-fourth Day of December 1985

[SEAL]

Attest:

DONALD J. QUIGG

Attesting Officer  Commissioner of Patents and Trademarks